United States Patent Office 3,233,497
Patented Feb. 8, 1966

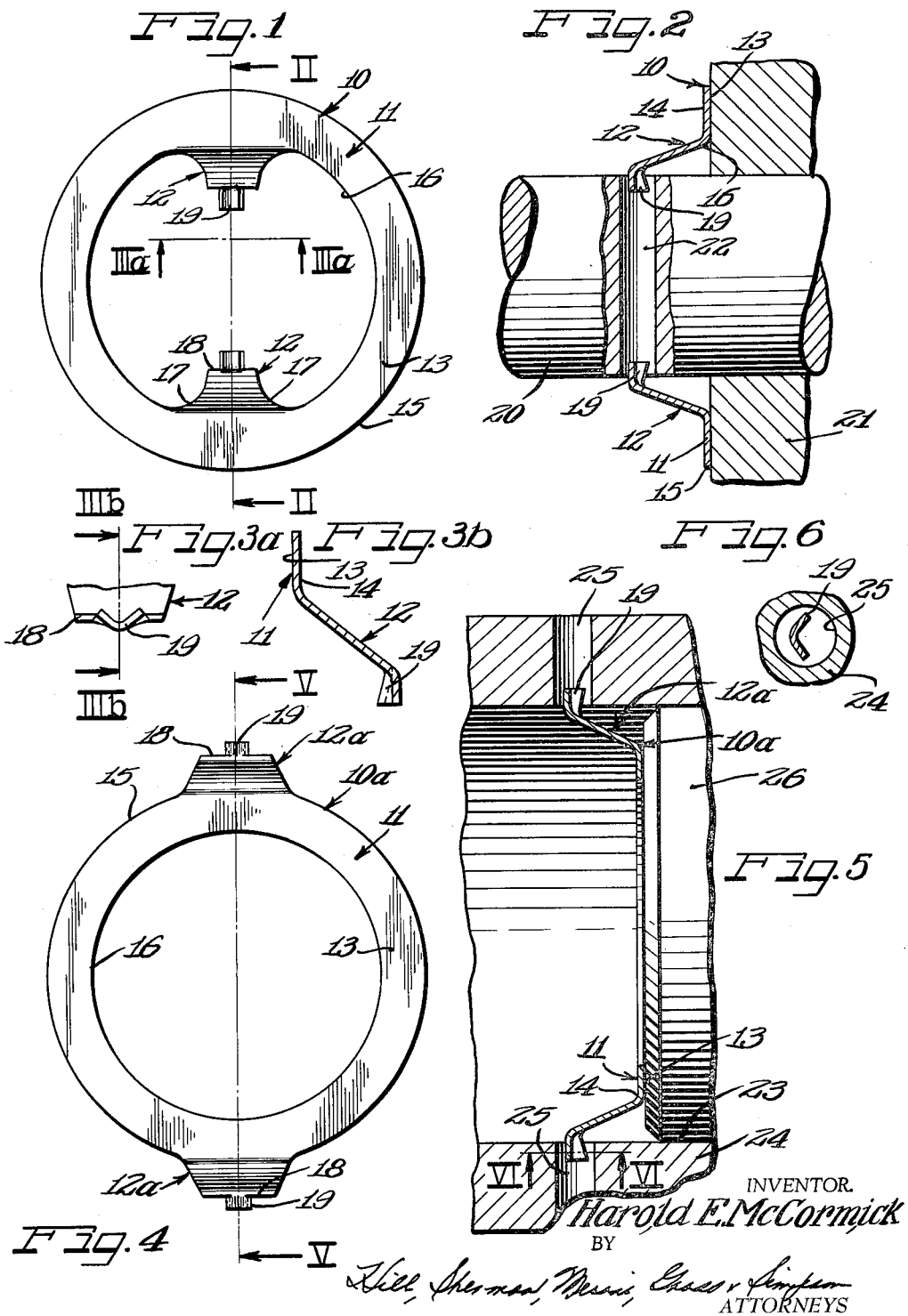

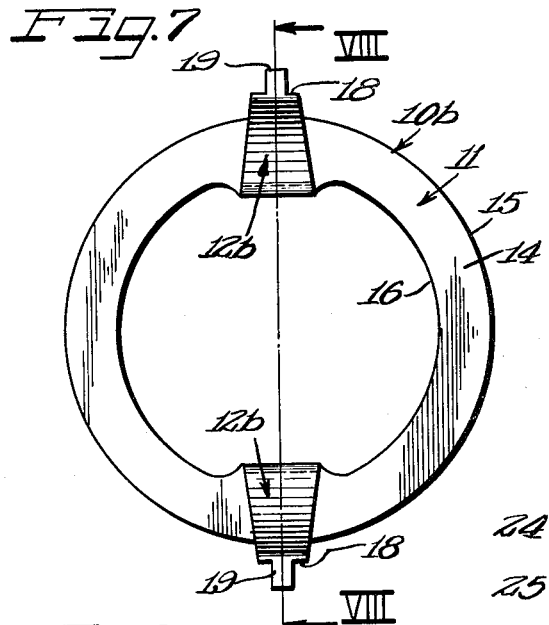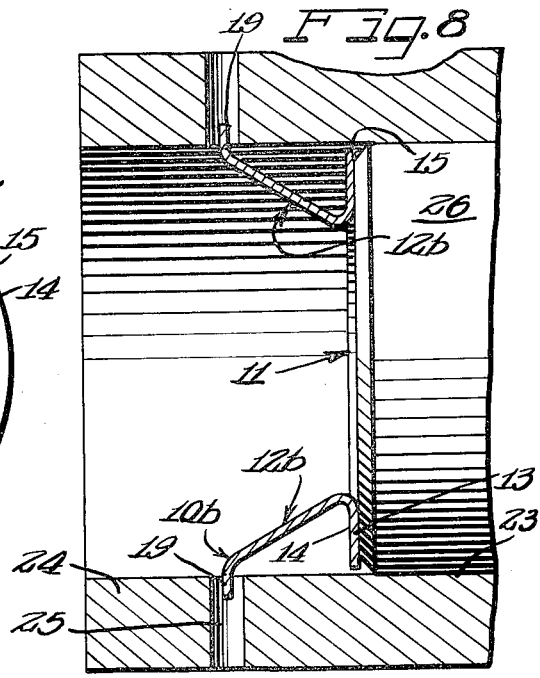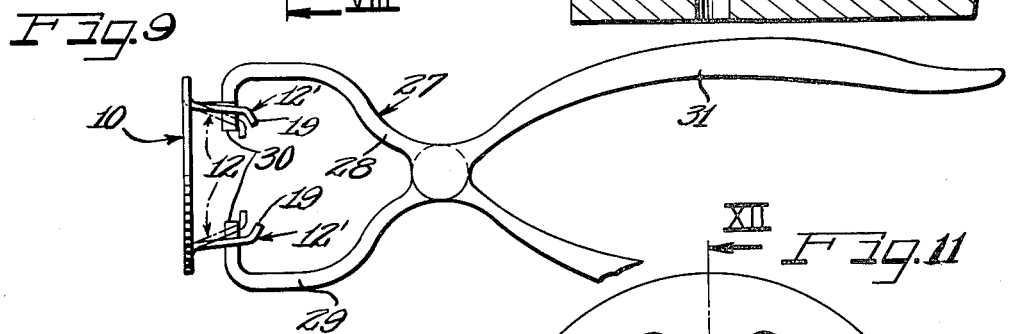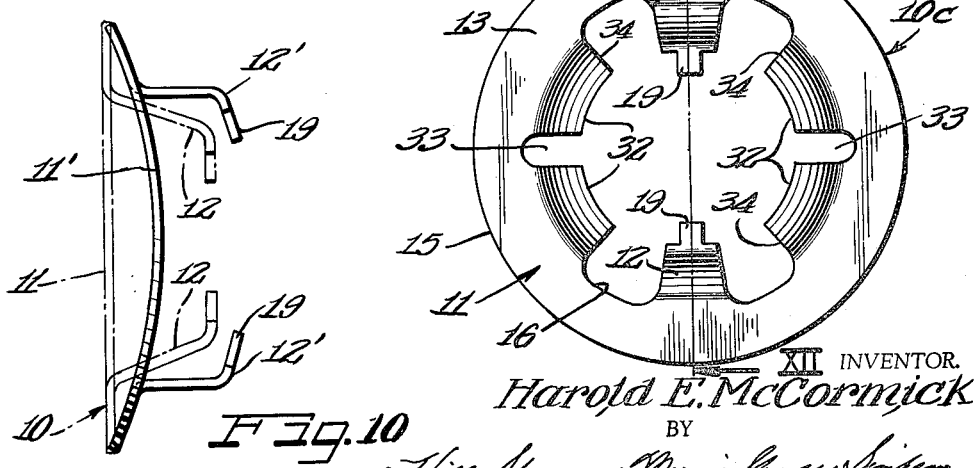

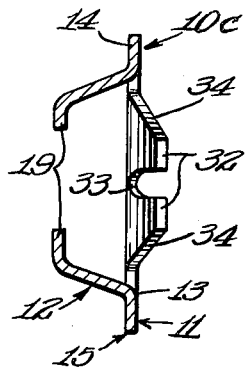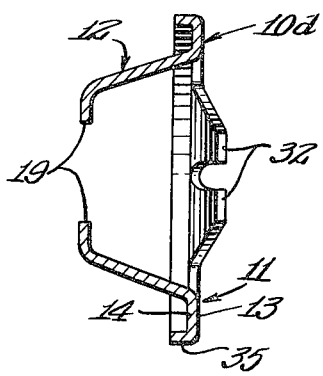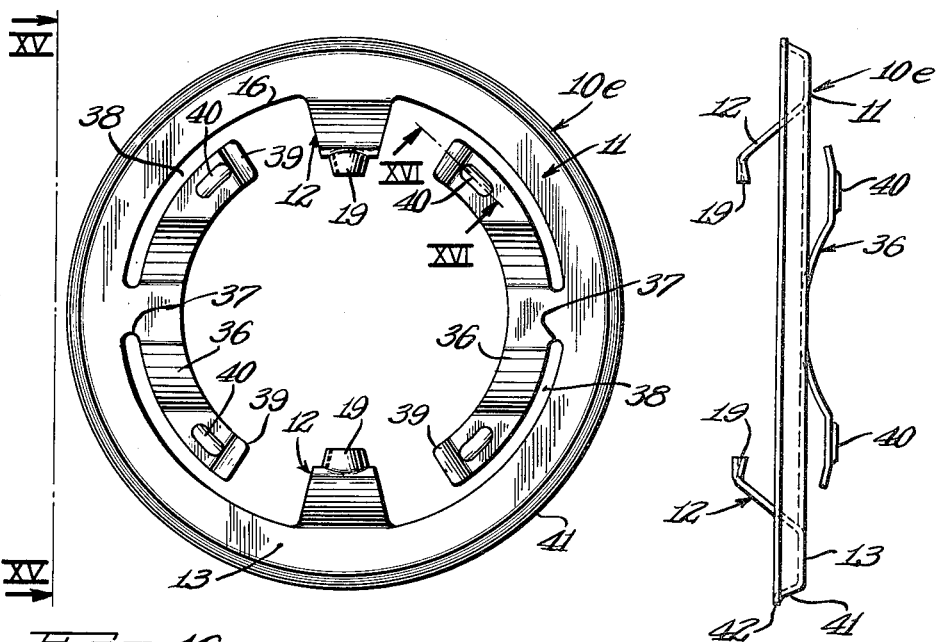

3,233,497
SPRING FINGER RETAINING RINGS
Harold E. McCormick, Brentwood, Mo., assignor to Ramsey Corporation, St. Louis, Mo., a corporation of Ohio
Filed Dec. 12, 1963, Ser. No. 330,135
3 Claims. (Cl. 85—8.8)

This invention relates to retaining rings or clips for providing a positive abutment to position one member relative to another member. Specifically this invention relates to retaining rings adapted to be mounted on a shaft or in a housing to form an abutment shoulder for positioning a member surrounding the shaft or inserted in the housing.

Heretofore retaining rings or clips obtained their retention capacity either by insertion in a groove or a thread machined into a shaft or bore or by an interference fit between the ring and shaft or bore. In many applications the frictional type of retention is not sufficiently positive and the machining of grooves or threads in the shaft or bore creates objectional stress risers and requires an expensive forming operation. Further the groove and interference types of retention do not prevent rotation between the ring or clip and the retained part making possible relative rotation causing wear and eventual failure. In the past means for preventing such rotation have taken the form of pin devices inserted through holes in the shaft or bore and to prevent concentration of loads at the pin a washer was inserted between the pin and the retained part. Also where resiliency was required to take up machining tolerances or to exert a force on the retained part, spring washers had to be interposed between the retainer ring and part. All of these pin and washer equipped assemblies were expensive, required a stack-up of parts and presented assembly difficulties.

The present invention now provides a one piece retaining ring or clip providing positive retention and only requiring an inexpensive drilled hole or well in the shaft or bore. The devices of this invention are easily formed metal washers with laterally extending spring fingers having locking tabs or lugs on the ends thereof substantially parallel with the plane of the washer body. The tabs are snapped into a drilled hole in either the bore or the shaft to positively position the annular washer body for providing a full annular retaining shoulder on the shaft or in the body. In the externally applied form, the spring fingers extend laterally from a periphery of the washer body and the tabs extend inwardly from the ends of the fingers. In the external form, the spring fingers extend laterally from a periphery of the washer body and the tabs then extend outwardly from the ends of these fingers. In installation the fingers may be lifted by means of a pliers, screwdriver, or a special tool, or the entire ring may be bowed in the axial direction to displace the tabs sufficiently for clearing the shaft or bore.

Both the external and internal forms of the retainer rings of this invention can be provided with spring fingers on the abutment face of the annular body to create a resilient force on the member retained thereby.

It is then an object of this invention to provide a positive locating retainer ring which only requires an easily created inexpensive retaining hole in the part receiving the ring.

Another object of this invention is to provide retainer rings eliminating heretofore necessary grooves, threads, and the like high stress riser formations in the part to which the ring is affixed while at the same time providing positive positioning of an abutment shoulder on the part.

Another object of the invention is to provide a retaining ring having a full annular abutment shoulder which is positively positioned on a shaft or in a bore without requiring high stress riser cuts on the shaft or in the bore.

A still further object of this invention is to provide a non-rotating retaining ring providing a positive shoulder on a drilled part on which it is mounted without creating a stress concentration in the part.

A still further object of the invention is to provide a non-rotating retaining ring adapted to absorb a thrust load or exert a spring force in housings or on shafts while maintaining a positive abutment location thereon.

A still further object of the invention is to provide a retaining ring which can be removed from the part on which it is mounted without damaging the same.

Other and further objects of this invention will be apparent to those skilled in this art from the following detailed description of the annexed sheets of drawings which, by way of preferred examples only, illustrate several embodiments of the invention.

On the drawings:

FIGURE 1 is a plan view of an external retaining ring of this invention.

FIGURE 2 is a transverse cross sectional view taken along the line II—II of FIG. 1 and illustrating the manner in which the ring is positioned on a shaft to form an abutment shoulder for a part surrounding the shaft.

FIGURE 3a is an enlarged fragmentary end view of a locking tab and spring finger taken along the line IIIa—IIIa of FIG. 1.

FIGURE 3b is an enlarged longitudinal cross sectional view along the line IIIb—IIIb of FIG. 3a.

FIGURE 4 is a plan view of an internal locking ring of this invention.

FIGURE 5 is a transverse cross sectional view along the line V—V of FIG. 4 illustrating the ring mounted in the bore of a housing.

FIGURE 6 is a cross sectional detailed view along the line VI—VI of FIG. 5 illustrating the seating of the tab in the drilled retaining hole of the housing.

FIGURE 7 is a plan view of another internal form of locking ring according to this invention.

FIGURE 8 is a transverse cross sectional view along the line VIII—VIII of FIG. 7 illustrating the ring mounted in the bore of a housing.

FIGURE 9 is a side elevational view of an external retaining ring of this invention illustrating the manner in which the spring fingers can be lifted by a special tool for quick application of the ring on a shaft.

FIGURE 10 is a side elevational view illustrating another manner of applying the ring to a shaft by bowing the ring in an axial direction.

FIGURE 11 is a plan view of an external retaining ring of this invention equipped with springs to provide a resilient abutment shoulder.

FIGURE 12 is a transverse cross sectional view along the line XII—XII of FIG. 11.

FIGURE 13 is a view similar to FIG. 12 but illustrating the ring equipped with a peripheral flange to add stiffness thereto.

FIGURE 14 is a plan view of another form of external ring equipped with spring fingers to exert a resilient force on the part bottomed thereagainst.

FIGURE 15 is an end elevational view of the ring of FIG. 14 along the line XV—XV of FIG. 14.

FIGURE 16 is a fragmentary cross sectional view along the line XVI—XVI of FIG. 14.

As shown on the drawings:

The retaining ring 10 of FIGS. 1 and 2 is a one piece annular metal body 11 with diametrically opposed fingers 12, 12 projecting therefrom. The annular body 11 has a flat front face 13 and a similar flat back face 14, an outer circular periphery 15 and an inner circular periphery 16 from which the fingers 12 extend. Each finger 12 extends laterally from the back face 14 in an axially outward and radially inward sloping direction. The fingers are flat segments joined to the inner periphery 16 along rounded fillet portions 17 and converging to flat end edges 18 from which project tabs or lugs 19 in offset relation to the fingers and substantially parallel to the plane of the washer body 11. These tabs 19 as best shown in FIGS. 3a and 3b are rounded to increase the stiffness thereof and the contour of the tabs generally conforms with holes in which they are to be seated. The tabs 19 are relatively short in comparison with the length of the fingers 12.

As shown in FIG. 2 the ring 10 is mounted on a shaft 20 to form an abutment retainer for a member 21 surrounding the shaft. The shaft 20 has a radial hole 22 drilled therethrough and the tabs 19 are snapped into this hole with the end edges 18 of the spring fingers bottomed on the shaft. The shaft of course has a larger diameter than the free space between the tabs 19 so that the tabs will be seated in the hole 22 for substantially their entire length. If desired the free space dimension between the edges 18 of the diametrically opposed spring fingers 12 can be less than the diameter of the shaft so that these edges will be firmly bottomed on the shaft. However such bottoming is not necessary because the tabs 19 in the hole 22 provide the positive locking action. As illustrated in FIG. 2 the front face 13 of the washer body 10 provides a full annular shoulder abutment for the part 21 surrounding the shaft 20.

In the internal form shown in FIGS. 4 and 5 the retaining ring 10a has parts identical with parts described in FIGS. 1 to 3 marked with the same reference numerals and includes the same annular washer body 11 but with spring fingers 12a extending from the outer periphery 15 instead of the inner periphery. These spring fingers also extend laterally from the back face 14 of the washer body but in an axially outward direction so that their end edges 18 will be outwardly from the outer periphery of the ring. The tabs or lugs 19 then project outwardly from these ends in substantially the plane of the ring body 11.

As shown in FIG. 5 the internal ring 10a is seated in the bore 23 of a housing 24. The housing has diametrically opposed holes 25 drilled therethrough and the tabs 19 are snapped into these holes being held therein by the spring fingers 12a. The front face 13 of the annular body 11 provides a full annular shoulder for a part 26 mounted in the bore 23. The diameter of the bore 23 is less than the free state dimension between the outer ends of the tabs 19 so that these tabs will be seated in the holes 25 for substantially their entire length. The assembly provides positive axial positioning of the part 26 in the bore and of course the tabs 19 also hold the ring against rotation in the bore.

FIGS. 7 and 8 illustrate a modified internal retainer ring 10b with parts identical to those described in FIGS. 4 and 5 being marked with the same reference numerals. As shown in FIG. 7 spring fingers 12b project from the inner periphery 16 of the ring body 11 but instead of extending radially inward like the fingers 12 of FIG. 1, they are bent backwardly to extend axially and radially outward as better shown in FIG. 8. The end edges 18 of the fingers 12b project beyond the outer periphery of the body 11 and the tabs 19 thereon of course project beyond these edges and extend substantially parallel with the plane of the body 11. As shown in FIG. 8 the body 11 fits freely in the bore 23 with the spring fingers 12b extending from the back face of the ring axially and radially outward to their end tabs 19 which are seated in the holes 25 drilled in the housing 24. The full annular abutment for the member 26 is thus provided in the bore 23 by the front face 13 of the body 11.

As shown in FIG. 6 the rounded tabs 19 of both the spring fingers 12a and 12b extend into the hole 25 to generally conform to the circular contour of the hole and to provide a very rigid unbending member for abutment with the bore of the hole.

FIG. 9 illustrates the manner in which an external ring 10 can have the spring fingers 12 thereof lifted by a tool 27 to spread apart positions 12' for easy application of the retainer ring onto a shaft or the like. The tool 27 has a tong end 28 composed of pivoted together fingers 29 adapted to encompass a shaft. These fingers 29 have inturned ends with finger retaining lugs 30 thereon. The lugs 30 are slipped under the fingers 12 and the handle 31 of the tool is then squeezed to separate the fingers 29 thereby lifting or spreading the fingers 12' apart so that their tab ends 19 will clear the shaft. Then when the tabs 19 are aligned with the hole 22 in the shaft the tool is released whereupon the fingers will snap the lugs into the hole. The external fingers 12a can be depressed by a similar tool until the tabs 19 are aligned with the holes 25 whereupon release of the tool will permit the fingers to snap the tabs into the holes.

As shown in FIG. 10 the external retainer ring 10 can also be mounted on a shaft by axially bowing the washer body 11 from the free state position shown in dotted lines to the bowed position 11' shown in solid lines. This bowing will move the spring fingers 12 from their dotted line position to the solid line positions 12' thereby of course spreading the tabs 19 sufficiently apart to clear the shaft.

In the embodiment 10c of FIGS. 11 and 12 parts identical with parts described in connection with FIGS. 1 to 3 have been marked with the same reference numerals. As shown the washer annulus or body 11 has the same spring fingers 12 and tabs 19 as in FIGS. 1 to 3 but in addition the inner periphery 16 is provided with a pair of thrust spring fingers 32 on each side of the fingers 12 and projecting laterally from the front face 13 of the washer body 11. As shown these fingers are on opposite sides of slots 33 which are disposed 90° to the tabs 19. Each finger 32 extends from the slot 33 to an edge 34 which is spaced circumferentially from the sides of the fingers 12 and of course slopes in the opposite direction as the fingers. The thrust spring fingers 32 extend laterally outward and radially inward from the front face 13 of the body ring 11 and their radial inner ends lie in a single plane forwardly displaced from the front face 13 and parallel thereto. Thus four spring contact areas are provided to constitute the thrust face for receiving a member such as 21 of FIG. 2 thereagainst. While the lugs 19 seated in a shaft hole 22 will of course fixedly position the washer body 11 on the shaft the spring fingers 32 receiving the thrust of the member to be positioned, such as 21, thereagainst, can yield to exert a resilient spring force thereagainst and thereby either form a spring bottom to load the member 21 or accommodate tolerance variations for the seated position of the member.

If it is desired to stiffen the retainer rings of this invention the same can be provided with a skirt or flange as shown in the embodiment 10d of FIG. 13. In FIG. 13 parts identical with parts described in connection with the embodiment 10c of FIGS. 11 and 12 have been marked with the same reference numerals. The retainer ring 12d has an annular skirt or flange 35 formed on the outer periphery of the ring body 11. This flange 35 is in substantially right angle relation to the faces 13 and 14 of the ring body 11 and as shown extends rearwardly from the face 14 so as not to interfere with the spring action of the fingers 32 on which the thrust load is applied. The flange or skirt 35 can be as shallow or deep as desired to impart the desired rigidity to the ring. Of course a skirt or flange equipped ring 12d cannot be axially bowed for assembly as illustrated in FIG. 10.

In the embodiment 10e of FIGS. 14 and 15 the same basic thrust spring arrangement illustrated for rings 10c and 10d in FIGS. 11 to 13 is provided and identical parts have been marked with the same reference numerals. However in the embodiment 10e the inner periphery 16 of the main annulus body carries a pair of diametrically opposed segmental annular spring fingers 36 connected to the inner periphery by a single connecting portion 37 at the longitudinal centers of the fingers 36. The outer peripheral edges of the fingers 36 are radially inward from the inner periphery 16 and gaps 38 are thus provided between the inner periphery and these outer edges. The spring fingers 36 extend around the inner periphery 16 of the ring body to outer edges 39 which are circumferentially spaced from the spring fingers 12. The thrust fingers 36 extend over an appreciable arc and have raised contact buttons 40 near their outer ends. These buttons 40 are positioned about 45° from a diameter line through the centers of the spring fingers 12 so that the four contact areas 40 will be disposed 90° apart from each other and 45° from the diameter line of the spring fingers.

As shown in FIG. 15 the fingers 36 are raised forwardly from the front face 13 of the washer body 11 so that the contact buttons 40 lie laterally displaced from the plane of the washer body and present thrust faces substantially parallel with the plane of the washer body. The washer body 11 is provided with a sloping skirt or flange 41 around the outer periphery thereof and the edge of this flange terminates in an outer rim. The flange and rim stiffen the assembly against axial bowing. The retainer ring 10e thus functions in the same manner as the ring 10d.

The rings of this invention can be easily and inexpensively stamped from sheet metal and can be hardened and spring tempered to provide stiff rigid annulus bodies and spring fingers of the desired stiffness. The retainer rings of both the external and internal type will positively locate the thrust shoulder in an assembly and since they only require inexpensive and easily formed drilled holes to receive the spring finger carried positioning tabs thereof they do not deface or in any way weaken the parts to which they are applied. The rings of this invention can be easily removed without destroying their retaining capacity or without damaging the parts on which they are mounted. The thrust faces of these retainer rings can be equipped with thrust receiving spring fingers to provide a resilient bottoming for the thrust load at a positive location. No additional locking devices, connecting devices or other thrust surface receiving devices are needed.

Although various minor modifications might be suggested by those versed in the art, it should be understood that I wish to embody within the scope of the patent granted hereon all such embodiments as reasonably and properly come within the scope of my contribution to the art.

I claim as my invention:

1. A retainer ring for use with a first part having a hole therein to be locked axially and circumferentially relative thereto to provide an abutment shoulder for a second part which comprises an annular body having an inner periphery, an outer periphery, and a pair of flat faces therebetween, a pair of diametrically opposed spring fingers projecting laterally and inwardly from the inner periphery of one face of the body, tabs on the ends of the spring fingers extending inwardly in angular relation to the fingers and lying substantially parallel to the plane of the body, said tabs being of less width than the spring fingers and projecting from the central portions of the ends of the spring fingers for fitting into the hole of the first part, said spring fingers having end edges on each side of the tabs with the width of said fingers at said end edges being greater than the diameter of the hole of the first part to provide shoulders for engaging the first part at the mouths of the hole for limiting the degree of projection of the tabs into the hole, and said tabs being flanged along each side thereof to stiffen the tabs against bending.

2. A retainer for use with a hollow first part having a pair of holes therein to be locked axially and circumferentially relative thereto for providing an abutment shoulder for a second part in the interior of the hollow first part which comprises a body having an outer periphery and a pair of flat faces extending radially inward from said outer periphery, a pair of diametrically opposed spring fingers projecting laterally and outwardly from the outer periphery of one face of the body, tabs on the ends of the spring fingers extending radially outwardly in angular relation to the fingers and lying substantially parallel to the plane of the body, said tabs being of less width than the spring fingers and projecting from the central portions of the ends of the spring fingers for fitting into the holes of the first part, said spring fingers having end edges on each side of the tabs with the width of said fingers at said end edges being greater than the diameters of the holes of said first part to provide shoulders for engaging the first part at the mouths of the holes for limiting the degree of insertion of the tabs into the holes, and said tabs being flanged along each side thereof to stiffen the tabs against bending.

3. A retainer ring for use with a hollow first part having diametrically opposed holes to be locked axially and circumferentially relative thereto for providing an abutment shoulder for a second part in the first part which comprises an annular body having an inner periphery, an outer periphery, and a pair of flat faces therebetween, a pair of diametrically opposed spring fingers projecting laterally and outwardly from the inner periphery of one phase of the body, tabs on the ends of the spring fingers extending radially outwardly in angular relation to the fingers and lying substantially parallel to the plane of the body, said tabs being of less width than the spring fingers and projecting from the central portions of the ends of the spring fingers for fitting into the holes of the first part, said spring fingers having end edges on each side of the tabs with the width of the fingers at said end edges being greater than the diameter of the holes to provide shoulders for engaging the first part at the mouth of the hole for limiting the degree of projection of the tabs into the hole, and said tabs being flanged along each side thereof to stiffen the tabs against bending.

References Cited by the Examiner

UNITED STATES PATENTS

| | | | |
|---|---|---|---|
| 2,211,728 | 8/1940 | MacFadden | 85—7 |
| 2,252,286 | 8/1941 | Hathorn | 85—8.8 |
| 2,468,847 | 5/1949 | Trainor | 85—8.8 |
| 2,577,319 | 12/1951 | Feitl | 85—8.9 |
| 2,615,759 | 10/1952 | Becker | 85—8.8 |
| 2,712,262 | 7/1955 | Knohl | 85—36 |
| 3,032,807 | 5/1962 | Lanius | 85—36 |

FOREIGN PATENTS 780,237  7/1957  Great Britain.

CARL W. TOMLIN, *Primary Examiner.*

EDWARD C. ALLEN, *Examiner.*